United States Patent [19]

Obrist

[11] Patent Number: 4,492,068
[45] Date of Patent: * Jan. 8, 1985

[54] CLOSURE APPARATUS WITH MAGNETIC COUPLING FOR SCREWING ON A PLASTICS SCREW CLOSURE

[75] Inventor: Albert Obrist, Kaiseraugst, Switzerland

[73] Assignee: Albert Obrist AG, Reinach, Switzerland

[ * ] Notice: The portion of the term of this patent subsequent to Dec. 21, 1999 has been disclaimed.

[21] Appl. No.: 408,681

[22] Filed: Aug. 16, 1982

Related U.S. Application Data

[63] Continuation of Ser. No. 143,751, Apr. 25, 1980, Pat. No. 4,364,218.

[30] Foreign Application Priority Data

Apr. 25, 1979 [CH] Switzerland .................. 3 885/79

[51] Int. Cl.³ ............................................. B65B 3/20
[52] U.S. Cl. ............................................. 53/331.5
[58] Field of Search ............ 53/331.5, 317, 331; 310/103, 104; 464/29

[56] References Cited

U.S. PATENT DOCUMENTS

| | | | |
|---|---|---|---|
| 2,076,631 | 4/1937 | Gantzer | 53/317 |
| 2,435,112 | 1/1948 | Wightman | 310/103 |
| 2,705,101 | 3/1955 | Everett | 53/317 |
| 3,573,517 | 4/1971 | Osterstrom | 310/103 |
| 3,714,760 | 2/1973 | Roberts et al. | 53/331.5 X |
| 3,913,301 | 10/1975 | Keller et al. | 53/331.5 |
| 4,065,234 | 12/1977 | Yoshiyuki et al. | 464/29 X |
| 4,153,851 | 5/1979 | Hovorka | 310/103 X |
| 4,222,215 | 9/1980 | Takano | 53/331.5 |
| 4,246,738 | 1/1981 | Ono | 53/331.5 |
| 4,364,218 | 12/1982 | Obrist | 53/331.5 |

FOREIGN PATENT DOCUMENTS 1430250 3/1976 United Kingdom .............. 310/103

*Primary Examiner*—Horace M. Culver
*Attorney, Agent, or Firm*—William R. Hinds

[57] ABSTRACT

A magnetic clutch is provided for transmitting and limiting the torque in screw-on heads for screw closures. The clutch has a high number of poles (at least eight and preferably twelve poles) and the spacing between the clutch magnets, is at least six times the total axial tolerances between the clutch magnets.

10 Claims, 5 Drawing Figures

CLOSURE APPARATUS WITH MAGNETIC COUPLING FOR SCREWING ON A PLASTICS SCREW CLOSURE

This is a continuation of application Ser. No. 143,751 filed Apr. 25, 1980 now U.S. Pat. No. 4,364,218.

FIELD OF THE INVENTION

This invention relates to closure apparatus for screwing a plastics screw closure on to a container provided with a screwthread. The apparatus can be driven by a drive means and is provided with a screw-on head for screwing on the screw closure, and with a torque-dependent clutch arranged between the screw-on head and the drive means which interrupts the screwing-on process when a predeterminable desired torque is reached.

BACKGROUND OF THE INVENTION

Various forms of closure apparatus for screwing on screw closures are known and are conventional. In order to ensure that the screw closure is not screwed on too tightly, which could possibly result in damage, such closure apparatuses are provided with a torque-dependent clutch to limit the maximum torque which can be transmitted.

In practice, virtually only slipping clutches are used for this purpose. Slipping clutches of this kind are known for example, from published German Patent Application No. 24 36 993. Mechanical torque-limiting assemblies have also already been proposed, for example, U.S. Pat. Spec. No. 3,405,499.

Difficulties are caused in the known closure apparatuses in particular due to the function of the clutches which are susceptible to wear and which suffer from a wide range of variation in regard to the maximum torque values, particularly under the fluctuating environmental conditions to which bottle filling plant is exposed. In addition, the clutch arrangements are expensive to construct, require frequent adjustment and setting and are susceptible to trouble.

SUMMARY OF THE INVENTION

An object of the invention is to avoid the disadvantages of the known constructions, and in particular to provide a closure apparatus of the above-indicated kind, which transmits a constant torque irrespective of environmental influences which is of simple construction, and which does not require adjustment.

According to the invention, this is primarily achieved by using a magnetic clutch as the torque-dependent clutch. Although the problems associated with screwing on closure apparatus have existed and been recognised for more than 20 years, the use of magnetic clutches in this field of application has hitherto not been proposed. The probable reason for this is primarily that the rising and falling (or, more accurately, positive and negative) torque characteristic of magnetic clutches during full relative rotation of the members thereof, and the torque tolerances when there are changes in the magnet spacing, indicated that magnetic clutches of this kind would apparently not be suitable. The present inventor however has found that magnetic clutches are excellently well suited for use as clutches with a torque limiting action in closure apparatus.

In a particularly advantageous form of a closure apparatus according to the invention, the clutch has a clutch plate at the drive side, and a clutch plate at the driven side, spaced from the drive-side clutch plate and connected to the screw-on head, the drive-side clutch plate and the driven-side clutch plate having on the facing surfaces of the plates permanent magnets of which the poles are so arranged that the two clutch plates attract each other at least in one relative position thereof. Such an arrangement makes it possible to reduce the moments of rotary inertia of the driven-side clutch plate. In addition, the magnets, which are disposed on both clutch plates, provide that there is a lower drop in torque from pole to pole when the driven-side clutch plate is turned through a complete revolution. For this purpose, the arrangement has a magnet pole ring with the poles having alternate polarities. A sufficiently uniform torque performance which eliminates any 'chattering' of the driven-side clutch plate when the clutch is rotating is advantageously achieved by the clutch plate having at least eight and preferably at least twelve magnets.

Making the magnets of an approximately cylindrical configuration provides a particularly compact and simple arrangement in respect of the magnets.

A particularly stable and wear-resistant arrangement is produced if the clutch plate has a concentrically extending shoulder against which the magnets lie laterally and are supported thereby. Embedding the magnets in a bed of curable plastics material provides stable mounting on the clutch plate and a further improvement in operating reliability. This arrangement reliably eliminates in particular the danger of magnetic shunts or leaks due to contamination by iron turnings or filings and the like. In addition, this causes the mounting of the magnets to be insensitive to shock and, in the event of damage, a magnet arrangement which has been cast in place in this way can be simply replaced.

A particularly compact and stable arrangement is provided if the plastics bed is of an approximately annular configuration and extends from the concentrically extending shoulder of the clutch plate to an outer edge outside the magnets and enclosing the magnets.

A further improvement in stability and damage in assembly is achieved if the magnets of at least one clutch plate are provided on that surface which faces towards the other clutch plate, with a non-magnetic cover means. In practice, brass has been found to be particularly suitable for this purpose. Particularly when using oxide magnets, a cover means of this type prevents damage to the magnets by shock, or for example, prevents the magnets from coming loose from the plastics bed. An arrangement of this kind may be embodied in a particularly advantageous manner if the cover means has a ring which extends on its outside and which surrounds the magnets embedded in the plastics bed and also protects the magnets at the periphery thereof. It has been found that the magnetic clutch transmits a uniform torque in a particularly constant manner which is independent of wear, when the spacing between the magnets of the two clutch plates is at least 4 mm. In this case, any fluctuation in spacing, for example, due to play in the axial bearing, between the two clutch plates only slightly influences the torque produced by the magnets. The invention may be embodied in a particularly advantageous manner if the spacing is at least six times the axial bearing play between the drive side and the driven side. It is known that, when the spacing between the magnets decreases or increases, the forces between the magnets increase and decrease respectively exponentially at least as the square with respect to the distance. Therefore, the greater the ratio between bearing play and air gap, the lower is the influence of tolerances and fluctuations in spacing between the two clutch plates.

It will be seen that the technical advance and the inventive content of the subject of this application are ensured both by the individual features used and also in particular by combination and sub-combination of the features employed.

BRIEF DESCRIPTION OF DRAWINGS

In the accompanying drawings:

Referring to FIG. 1, the closure apparatus illustrated has an outer clutch member 1 which is screwed on to a cylindrical central member 2. The central member 2 is axially displaceably fixed to a drive-side connecting member 3 which can be flange-connected in known manner to a drive means (not shown). Provided on the central member 2 are pins 4 which are displaceable in longitudinal slots 5 in the connecting member 3. Also provided on the connecting member 3 is a peripheral shoulder 6 which supports a spring 7 of which the other end bears against the central member 2. It will be seen that, by virtue of this arrangement, the central member 2 can be telescopically displaced in the connecting member 3 in the longitudinal direction, against the force of the spring 7; the pins 4 which slide in the longitudinal slots 5 both limit the longitudinal stroke movement and also provide for transmitting torque from the connecting member 3 to the central member 2.

Figure 1:
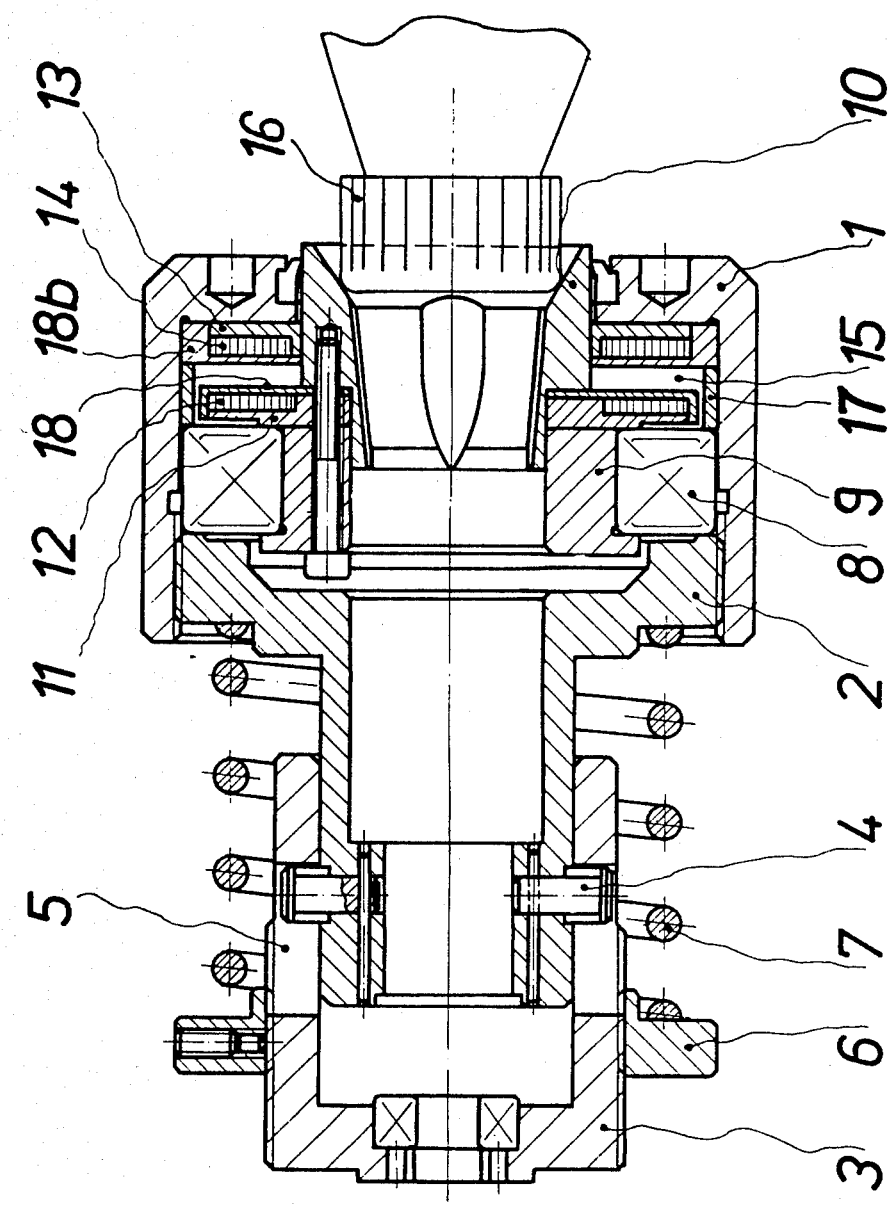
FIG. 1 is a cross-sectional view of one form of closure apparatus according to the invention.

The spring 7 and the longitudinal mobility of the outer clutch member 1 relative to the connecting member 3 is provided in known manner in order to adapt the clutch to tolerances in the height of the bottles when applying the apparatus to a bottle to be closed, and in particular also to accommodate the travel movement of the screw closure when it is being screwed on to the bottle. It will be appreciated that, instead of the spring 7, it is also possible to use a different compensating device, for example, an hydraulic device. The form of compensating device used does not have any limiting effect on the present invention.

Disposed in the central member 2 is a roller bearing 8 which carries an inner clutch member 9. The inner clutch member 9 is provided with a tapered screw-on head 10 which is arranged in known manner to accommodate a screw closure 16 and to grip it in a form-locking and/or force-locking manner during the screwing-on process. The screw-on head 10, which is mounted rotatably in the roller bearing 8 is connected to a driven-side clutch plate 11 which carries a plurality of permanent magnets 12. The outer clutch member 1 is provided with a drive-side clutch plate 13 on which a plurality of permanent magnets 14 is arranged. An air gap 15 is provided between the two clutch plates 11 and 13.

Figure 2:
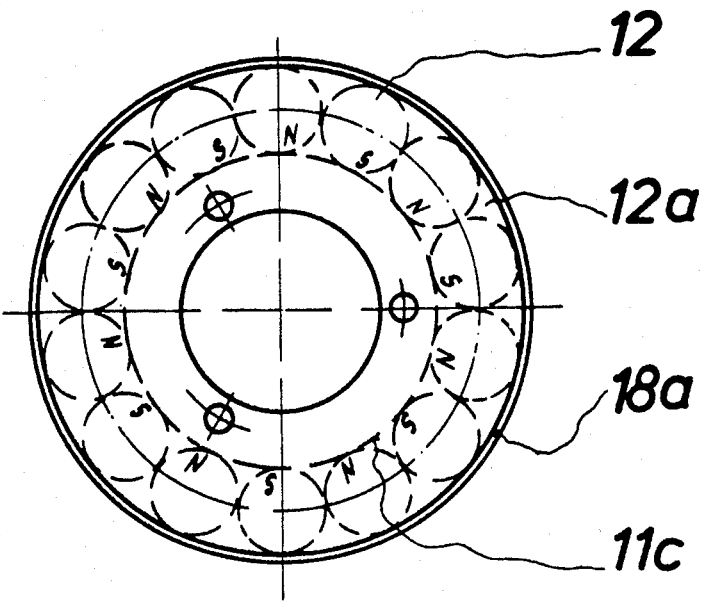
FIG. 2 is a plan view of the driven-side clutch plate of FIG. 1.
Figure 3:
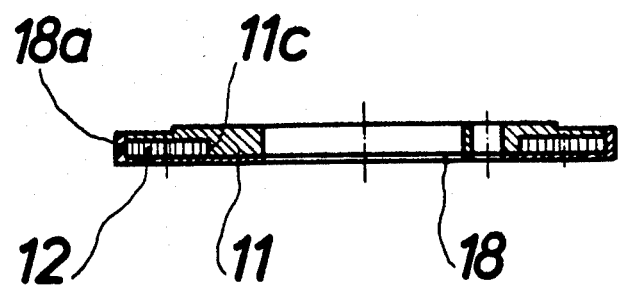
FIG. 3 is a sectional view of the clutch plate of FIG. 2.

As can be seen from FIGS. 2 and 3, the magnets 12 are disc-shaped oxide magnets which are arranged in a concentric circle on the clutch plate 11. The polarities of the magnets 12 alternate so in such a way that a North Pole and a South Pole follow each other alternately. The spaces 12a between the magnets are completely filled with a curable plastics material (for example, Araldite). The clutch plate 11 is closed by a cover means 18 of brass, which also forms a ring 18a surrounding the clutch plate 11 and the magnets 12 at the periphery thereof. The magnets are thus protected from shock or impact and are also held mechanically fast between the shoulder 11c of the clutch plate 11 and the ring 18a of the cover means 18.

The driven-side clutch plate 13, which is not shown in views corresponding to those of FIGS. 2 and 3, is of a configuration identical with the clutch plate 11. Accordingly, the driven-side clutch plate 13 which is secured to the inner clutch member 9 and which is freely rotatably mounted therewith in the rolling bearing 8 will in the rest condition be set in a position in which respective north/south magnets of the two clutch plates 11 and 13 are disposed opposite each other. The attraction force between the two clutch plates is determined by the dimensions of the magnets and the size of the air gap 15. Dimensioning the magnet arrangement in dependence on the desired torque is part of the known art and is fully familiar to the man skilled in the art. The large number of magnets on each clutch plate 11 and 13 advantageously ensures that, when the two clutch plates 11 and 13 are rotated relative to each other, the distance between two successive poles is so slight that 'chattering' of the clutch plate 13 or the screw-on head 10 is avoided. In this respect, clutch arrangements with ten to fourteen magnets have been found particularly suitable.

Locating the magnets 12 and 14 respectively in the annular gap between the cover means 18 and the clutch plate 11 is the simplest way of providing a clutch component wherein the magnets are protected from mechanical loadings, for example, due to shock or impact when the clutch is being assembled. In addition, casting the magnets 12 and 14 in plastics material ensures that contamination, for example, metal turnings or filings and the like, cannot subsequently cause a magnetic shunt between the magnets, which could detrimentally affect the force acting in the air gap 15.

The air gap 15 between the magnets 12 and 14 is about 4 mm in the embodiment illustrated. However, the effective distance between the magnets is about 6 mm as the brass cover means 18 is also disposed in the space between the magnets 12 and 14. The effective spacing between the magnets is thus about 6 mm. This relatively wide spacing advantageously ensures that bearing tolerances and play in the general assembly have only an insignificant influence on the torque to be transmitted.

Figure 4:
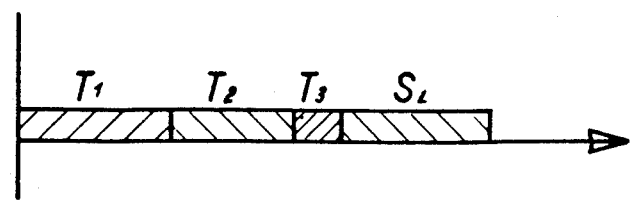
FIG. 4 is a diagrammatic representation of axial play and tolerances in the clutch.

FIG. 4 shows how the tolerances of the drive side (clutch plate 11, cover means 18), the driven side (clutch plate 13, cover means 18, spacer ring 17) and the tolerances of the rolling bearing 8 and the play therein are added together. It is preferable that, when determining the dimensions of the clutch assembly, the spacing between the magnets 12 and 14 is at least six times the value of the tolerances T1 (drive side), T2 (driven side), T3 (rolling bearing) and the rolling bearing play S1 (FIG. 4). This ensures that the torque performance is advantageously influenced only to a slight extent, by the component tolerances. This makes it unnecessary to provide for specific matching of the clutch and the clutch components in the course of the manufacturing process, and permits economical mass production of the closure apparatus. In practice, it has also been found that this dimensioning first permits practical use of the clutch. As, in closure apparatuses for bottle closures, the vertical loading of the screw-on head 10 against the pressure of the spring 7 causes a heavy axial loading of all movable parts, including those parts which influence the tolerances T1 to T3 and the play S1, a change in the tolerances T1 to T3 and the play S1 due to wear phenomena is to be observed, in contrast to the conventional magnetic clutches which are more usually stationary. For this reason inter alia, the use of magnetic clutches whose force transmission characteristic decisively depends on the air gap or the working distance between the rows of magnets, was considered as impossible in closure apparatuses.

Figure 5:
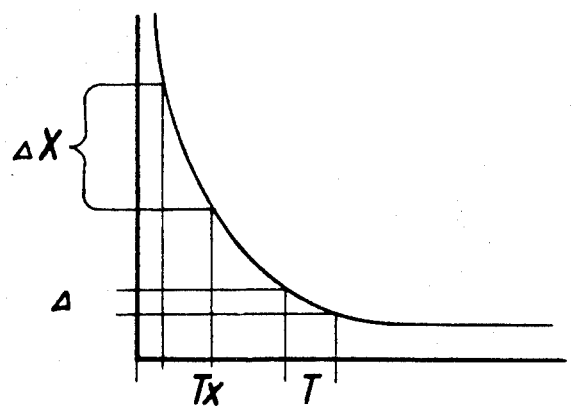
FIG. 5 is a diagrammatic representation of the influence of play and tolerances on torque.

FIG. 5 is a diagrammatic graph showing the nature of the torque transmission characteristic of the clutch arrangement in dependence on the tolerance range (including additional tolerances due to wear phenomena). It will be seen from the graph that the torque pattern is scarcely influenced by the use of the large air gap or the distance between the rows of magnets. Accordingly, there is only an extraordinarily slight change $\Delta$ in torque, upon a fluctuation T in the axial spacing. Dimensioning of this kind is far from the thoughts of the man skilled in the art, in itself, as the man skilled in the art will normally seek to keep the air gap as small as possible in order to produce the maximum possible forces or torque transmission and to be able to make the magnets 12 and 14 of small dimensions. The invention deliberately moves away from this principle and proposes an air gap, or spacing between the rows of magnets, which is at least six times greater than the maximum tolerances to be expected in the axial direction.

The influence of fluctuations Tx in the axial spacing on the torque $\Delta$ in a 'conventional' design of this kind is also shown in FIG. 5.

It will be seen therefore that the invention provides a closure apparatus which is of a simple construction, which can be economically manufactured in mass production, and which is also wear-free and ensures a uniform torque pattern.

I claim:

1. A closure apparatus for screwing a plastics screw closure onto a container provided with a screw-thread, said closure apparatus comprising a drive means and a screw-on head for screwing on the screw closure, a torque-limiting clutch arranged between the screw-on head and the drive means to interrupt the screwing-on process when a predetermined torque is reached, said clutch having a clutch member on the drive side and a clutch member on the driven side, said clutch members comprising clutch plates spaced from each other with plural permanent magnets positioned on facing surfaces thereof, the permanent magnets on each clutch member being arranged such that adjacent permanent magnets are of opposite polarity, and wherein in an idle position the permanent magnets defining aligned pairs of permanent magnets, each pair comprising one permanent magnet on each of the clutch plates, are of opposite polarity.

2. A closure apparatus as defined in claim 1, wherein said magnets are cast in a bed of curable plastics material.

3. A closure apparatus as defined in claim 4, wherein the plastics bed is of an annular cinfiguration and extends from a shoulder on the clutch plate to an outer edge extending outside and enclosing the magnets.

4. A closure apparatus as defined in claim 1, wherein the magnets of at least one clutch plate are provided, on the surface which is towards the other clutch plate, with a non-magnetic cover means.

5. A closure apparatus as defined in claim 4, having a ring around the periphery of the cover means.

6. A closure apparatus as defined in claim 1, having at least eight magnets disposed on each clutch plate.

7. A closure apparatus as defined in claim 1, having at least twelve magnets disposed on each clutch plate.

8. A closure apparatus as defined in claim 1, wherein the magnets are of an approximately cylindrical configuration.

9. A closure apparatus as defined in claim 1, wherein each clutch plate has a concentrically extending shoulder against which the magnets laterally lie.

10. A closure apparatus as defined in claim 1, wherein the magnets are surrounded at the outer periphery by a ring.

* * * * *